Aug. 31, 1937.   D. H. MONTGOMERY   2,091,557
MARINE POWER TRANSMISSION
Filed April 9, 1935   3 Sheets-Sheet 2
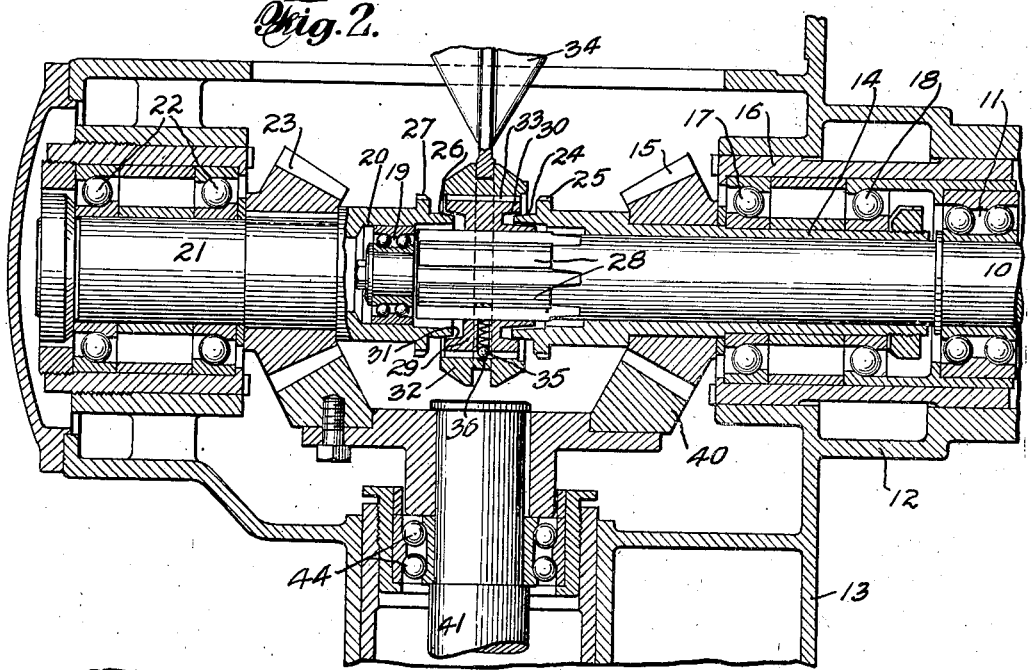
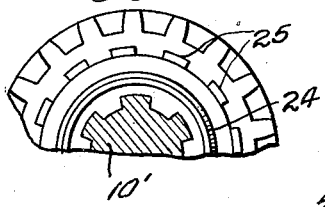
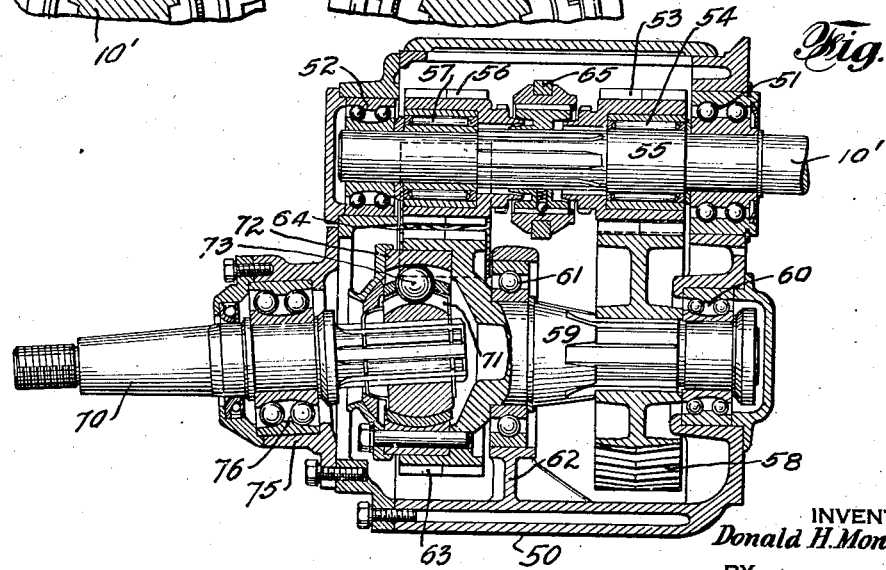
INVENTOR
Donald H. Montgomery
BY
ATTORNEYS Aug. 31, 1937.  D. H. MONTGOMERY  2,091,557
MARINE POWER TRANSMISSION
Filed April 9, 1935   3 Sheets-Sheet 3
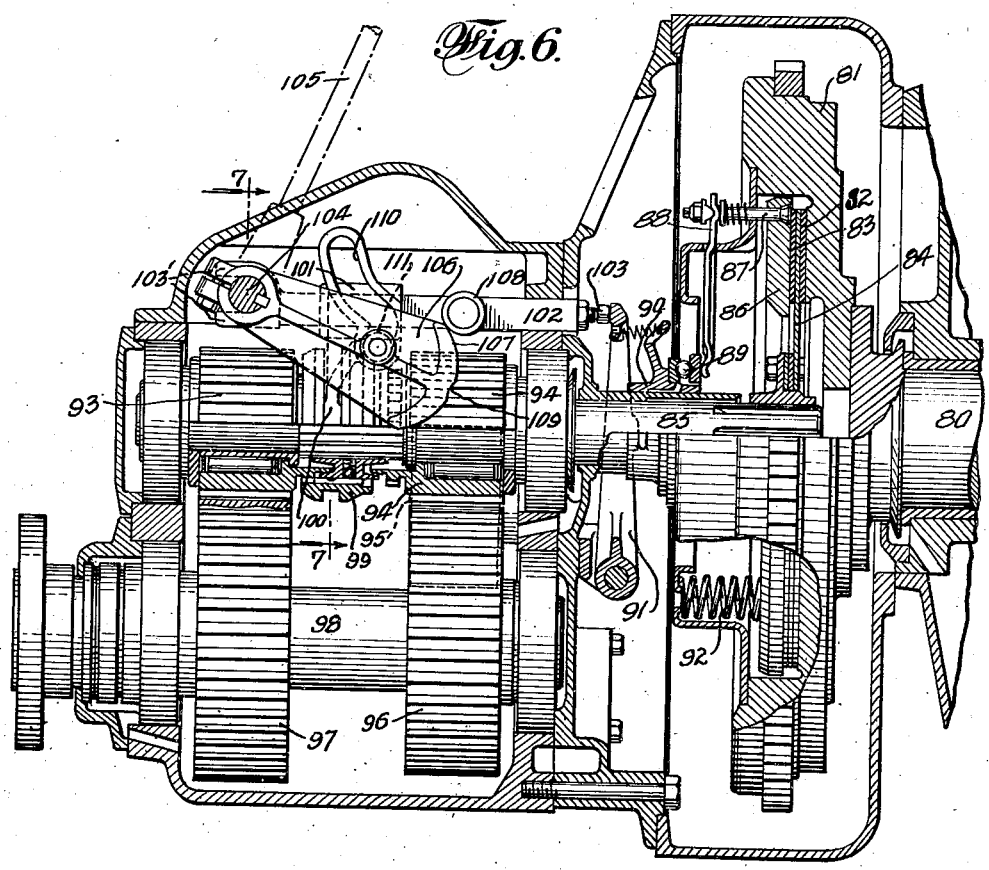
INVENTOR
Donald H. Montgomery
BY
ATTORNEYS Patented Aug. 31, 1937

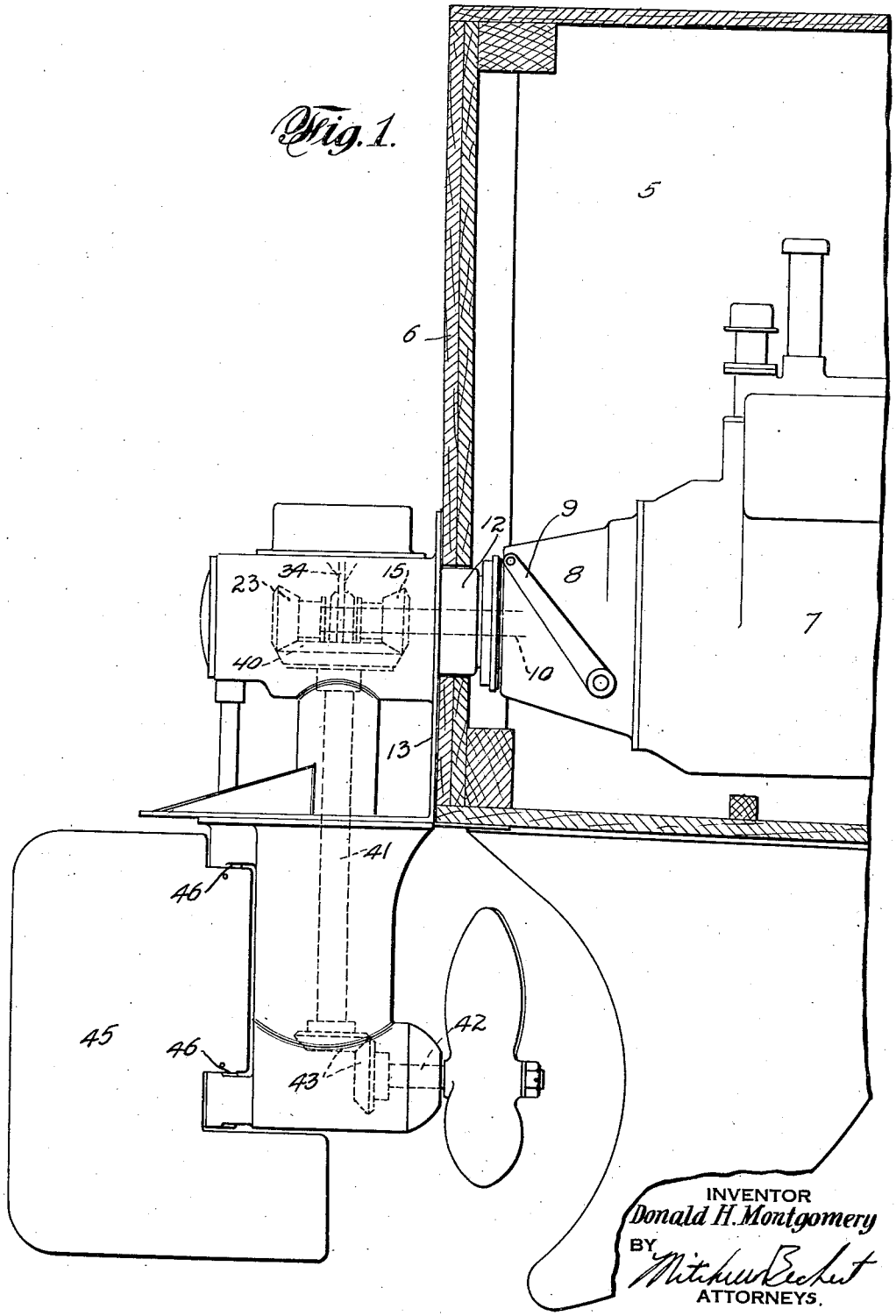

2,091,557

UNITED STATES PATENT OFFICE 2,091,557

MARINE POWER TRANSMISSION

Donald H. Montgomery, Berlin, Conn., assignor to Montgomery and Fleming, Incorporated, Hartford, Conn., a corporation of Connecticut Application April 9, 1935, Serial No. 15,501

7 Claims. (Cl. 192—3.5)

My invention relates to marine power transmissions and has particular relation to power transmissions adapted to drive the propeller of a boat in forward or reverse directions from an irreversible engine.

Heretofore it has been the general marine practice to provide a special marine engine together with a reverse gear unit, and in the case of high speed engines with a separate reducing gear unit. Attempts have been made to adapt modern high speed automotive types of engine to marine use, but the adaptation of such engines has entailed extensive conversion costs so that the net result has been in general no more satisfactory than when a standard marine engine was employed.

For marine use there are very substantial advantages in a high speed modern automotive type of engine, among the advantages being low first cost, lightness, compactness, and the ready availability of repair parts in nearly all parts of the country.

It is a general object of my invention, therefore, to provide simple, inexpensive, and efficient means for adapting high speed automotive or industrial type engines to marine use.

It is a more specific object to provide a combined reverse and reducing gear, which is simple in construction, relatively cheap to manufacture, and in general of higher efficiency than the combined efficiency of the separate reverse and reducing gears heretofore employed.

It is another object to provide an outboard reverse and reducing gear combined in a single unit and which will have substantially equal efficiency in both forward and reverse.

It is another object to provide a marine gear having provision for horizontal mounting of the engine regardless of the slant or angularity of the propeller shaft.

It is a further object to provide a reverse gear of the positive or tooth clutch type and having means for initiating the drive frictionally.

It is another object to provide an improved means to facilitate gear shifting.

Other objects and various features of invention will be hereinafter pointed out or will become apparent to one skilled in the art.

In the drawings which show, for illustrative purposes only, preferred forms of the invention—

Fig. 1 is a sectional view of the stern of a boat and an automotive engine and an outboard gear illustrating features of the invention;

Fig. 2 is an enlarged sectional view through a part of the outboard gearing shown in Fig. 1;

Fig. 3 is a central sectional view through an inboard reverse and reducing gear unit illustrating features of the invention;

Fig. 4 is an enlarged fragmentary end view of the right-hand or forward drive gear shown in Fig. 3;

Fig. 5 is an enlarged fragmentary end view of the clutch shown in Fig. 3 looking toward the left;

Fig. 6 is a sectional view of a reverse gear and clutch, illustrating improved means to facilitate gear shifting;

Fig. 7 is a sectional view taken substantially in the plane of the line 7—7 of Fig. 6.

In the drawings, and referring particularly to Figs. 1 and 2, 5 indicates generally a boat having a transom 6. The engine 7 is preferably mounted directly in the stern of the boat and may be mounted substantially horizontally as in automotive practice. The engine illustrated is of the high speed, high production type which is quite inexpensive and readily available in all parts of the country. Between the engine 7 and the transom is the usual clutch housing 8 housing a suitable disk or other type of friction clutch usually employed in automotive practice. The clutch is actuated through the clutch shift lever 9 in any suitable manner not disclosed.

The drive shaft 10 passes through the clutch housing and is journaled in a double row bearing 11 in a sleeve 12 extending from the outboard forward and reverse gear housing 13. The sleeve 12 may extend through an aperture in the transom and is suitably sealed therein and held in position when the main housing 13 is bolted or otherwise firmly secured to the transom. The shaft 10, extending toward the left in Fig. 2, is rotatably mounted in a quill or sleeve 14 which carries a forward driving bevel pinion 15 rigid therewith. The quill is rotatably supported in a sleeve 16 held within the sleeve 12, and in the form shown spaced pre-loaded ball bearings 17—18 serve to rotatably support the quill 14 both radially and axially. The shaft 10 extends farther to the left and at its extreme end is mounted in a double row bearing 19 floating in a recess 20 in the forward end of a reverse drive quill 21 which is itself rotatably supported both axially and radially by spaced apart pre-loaded bearings 22. The quill 21 carries the reverse bevel drive pinion 23 rigidly mounted thereon.

The quill 14 is provided with a friction clutch face 24 and positive clutch elements such as teeth 25. The reverse drive quill 21 is provided with a similar friction clutch face 26 and similar positive clutch teeth 27. The shaft 10 near its end is provided with splines 28 and a shiftable boss 29 is splined thereon for back and forth movement, as will be described. The splined boss is provided at opposite sides with friction clutch faces 30—31 for coaction with the adjacent friction clutch faces 24—26 on the respective drive quills. A positive clutch sleeve 32 is splined on the boss 29 and is provided internally with positive clutch teeth 33 for coaction with either the teeth 25 or the teeth 27 depending upon the position of the positive clutch sleeve 32. The clutch sleeve 32 may be shifted back and forth by a fork 34 which is actuated in any suitable manner (not shown). While the positive clutch sleeve 32 is splined to and slidable longitudinally of the shaft on the boss 29, the sleeve and boss are at times held in fixed position relatively to each other by releasable means such as a spring pressed ball 35 carried by the boss 29 and taking into a groove or depression 36 in the sleeve 32.

The teeth 33 may be termed "shiftable teeth", the teeth 25 as "forward drive teeth", the teeth 27 as "reverse drive teeth", and either teeth 25 or 27 as "selected teeth" (selected for engagement by teeth 33). All of these teeth in effect constitute two positive tooth clutches, but for convenience are referred to as the "forward and reverse gear clutch", "positive clutch" or "double-acting tooth clutch" or are identified collectively by similar language. The pairs of complementary friction faces 24—30, 26—31 are referred to as "friction clutch means", "friction pick-up devices" or are similarly identified. These terms are intended to apply to corresponding parts in Figs. 3 to 7 inclusive.

The forward and reverse bevel gears 15—23 are in mesh with a bevel gear 40 fixedly carried on a shaft 41 which extends downwardly in the housing. The shaft 41 is geared to the propeller shaft 42 for driving the same as by means of bevel gears 43. The shaft 41 is mounted top and bottom in bearings within the housing 13 which bearings may be in the form of double row ball bearings as indicated at 44 at the top of the shaft. All of the gearing described is mounted within and carried by the single housing 13, which, as stated, may be bolted directly to the transom of the boat. The housing 13 may carry an ample supply of lubricant which is cooled by the water surrounding the housing. Positive lubricating means may be provided, if desired, for lubricating the gears in the upper end of the housing. In the preferred form the housing 13 also acts as a support for the rudder 45 which may be journaled thereon as indicated at 46—46, and the rudder may be actuated in any suitable manner (not shown).

The operation of the device shown in Figs. 1 and 2 is as follows:

The clutch 8 may be thrown out and the clutch shift fork 34 may be moved toward the right. If the boat is moving, the propeller will ordinarily be turning. The first effect of shifting the clutch fork 34 will be to carry the sleeve 32, and through the releasable connection 35—36 the boss 29, toward the right so as to engage the friction faces 24—30 and thus cause the quill 14 and splined boss 29 and positive clutch sleeve 32 to rotate at substantially the same speed or at speeds sufficiently close together to permit a ready engagement of the positive clutch teeth 25 and 33. This latter engagement is effected by a further shift of the sleeve 32 toward the right which forces the ball 35 radially inwardly and out of its groove or notch 36 so as to permit the engagement of the positive clutch teeth noted. The main clutch 8 may then be engaged and the propeller will be driven by the engine positively in the forward direction. When it is desired to reverse, the main clutch 8 is preferably thrown out and the clutch shift fork 34 is then moved toward the left. The boat will at this time be moving forward and the propeller will continue to turn, rotating clutch teeth 27 in a direction opposite to that of teeth 33. Such movement of fork 34 first disengages the positive or forward drive clutch teeth 25—33 and again brings the groove 36 opposite the ball 35 to thus releasably hold the clutch sleeve 32 and splined boss 29 in engagement with each other. A further movement to the left causes engagement of the oppositely rotating friction fraces 26—31 which first reverses the direction of rotation of boss 29, shaft 10 and teeth 33 and then causes the shaft 10 and sleeve 21 to be brought up to substantially the same speed, or to speeds near enough to each other, whereby the positive clutch teeth 27—33 may be engaged upon a further shift of the sleeve 32 toward the left, as heretofore described. The boat usually is still moving forward and hence shaft 10 is rotating oppositely to the crank shaft (not shown) of the engine. The main clutch 8 is again engaged to initiate and effect reverse rotation of shaft 10 and the propeller shaft will then be driven in reverse direction by the shaft 10 clutched to the crank shaft.

Heretofore, so far as I am advised, it has been entirely impracticable to employ a simple form of double-acting tooth or bump reversing clutch to drive the propeller shaft alternately in forward or reverse directions because in reversing the propeller from full speed ahead to full speed astern, as often is necessary in an emergency, the linear speed limit of engagement of the oppositely rotating clutch teeth is materially exceeded, resulting in damage to the clutch, or such a loss of time as to involve the boat in a collision, or both. Therefore employment of the simple double-acting tooth clutch (alone) is virtually impossible in the use of the reduction gearing disclosed herein, because the propeller over-drives both the teeth 25 and the teeth 27, so that the speed limit of engagement of the shiftable teeth 33 therewith is materially exceeded. By means of the present improved construction such positive clutch means for forward and reverse have proven entirely practicable for the reason that one of the oppositely rotating positive clutch parts is first reversed in direction of rotation and the parts caused to rotate in the same direction and then are brought up to the same speed or to speeds sufficiently close together to permit ready engagement of the positive clutch teeth without damage. This can be accomplished very quickly because the disengagement of the main clutch leaves the relatively light drive shaft and parts carried thereby free for the described operation. Therefore, as has been repeatedly proved in practice, my improved construction operates safely and in the minimum of time in reversing the propeller.

It is to be noted that the provision of the separate main clutch, which is the "service clutch", permits the friction devices to be made small and light and by employing the automotive type of clutch, which is a spring-loaded dry-plate clutch, absolute freedom of the drive shaft from "drag" for reversing in the minimum of time is assured. At the same time overload protection for the propeller and propeller shaft is provided by such a clutch.

In the form shown in Fig. 3, the clutch shaft 10' (which may be clutched to the engine crank shaft by the usual friction clutch) extends into the gear housing 50 substantially horizontally and the engine may likewise be mounted horizontally as in automotive practice. The shaft 10' in the present instance is mounted at the right hand end of the casing 50 in a double row ball bearing 51 which may be secured in place by the clutch housing (not shown), and at the left hand end of the housing in a similar ball bearing 52, thus providing adequate support for the shaft. A forward drive gear 53 preferably in the form of a herring-bone spiral gear is rotatably mounted as by means of a roller or needle bearing 54 on the shaft 10' or an enlarged boss or bearing sleeve 55 thereon. At the left-hand end of the casing 50 a reverse drive gear 56 similar to gear 53 is rotatably mounted on the shaft 10' in the same manner as gear 53, i. e., as by means of a roller or needle bearing 57.

The gear 53 meshes with a gear 58 carried by a stub shaft 59 which may be mounted at one end upon and supported radially and axially by a ball bearing 60 in the housing 50, and at the other end in a ball bearing 61 in a bore in the web or flange 62 in the housing. The left-hand end of the stub shaft 59 is provided with or carries a gear 63 which through an intermediate or idler gear 64 mounted in the housing is driven by the reverse drive gear 56. Thus the stub shaft 59 may be driven in forward direction by means of the forward drive gear 53 and in the reverse direction by means of the reverse drive gear 56 and idler gear 64.

The gears 53 and 56 at their adjacent ends carry friction and positive clutch means which may be in all respects similar in construction and operation to those carried by the quills 14 and 21 heretofore described and which need not be here again described. In Figs. 3, 4 and 5 the same reference characters have been applied to the clutch parts as those appearing on corresponding parts in Fig. 2. Thus, when the clutch shift fork 65 of Fig. 3 is moved toward the right, the shaft 10' and gear 53 are first frictionally clutched to each other, after which the same may be positively clutched so as to drive the stub shaft 59 positively in forward direction. By moving the clutch fork 65 toward the left, the reverse drive gear 56 and shaft 10' are first frictionally clutched to each other and thereafter positively clutched so as to drive the stub shaft 59 in the reverse direction.

As illustrated in Fig. 3, the stub shaft 59 is arranged to drive the propeller shaft which in the drawings may be represented by a shaft 70 extending from the housing 50 and adapted to be secured to or be a part of the propeller shaft. The shaft 70 extends at an angle to the housing 50 and at its inner end is provided with a toothed boss 71 splined thereon. Internally the gear 63 is provided with a similar toothed ring 72, and one or more balls or other coacting devices 73 engage the teeth on the boss 71 and ring 72. The balls 73 and the coacting parts 71—72 constitute as a whole a constant velocity universal joint whereby rotation of the shaft 59 is transmitted to a propeller shaft 70 and at the same constant velocity as the shaft 59.

The shaft 70, extending from the housing 50 at an angle, is preferably mounted in an adapter housing 75 bolted or otherwise secured to the housing 50. The adapter housing is provided with a bore to receive a bearing such as a double row ball bearing 76 at the proper angle to support the shaft 70 at the desired angle to the horizontal. The bearing 76 is preferably of the double row type and takes both the radial and the axial thrust loads of the shaft 70.

As illustrated in Fig. 3, there is provided in a single housing a forward and reverse gear having both positive and friction clutch means, and by means of the universal joint within the housing the propeller shaft may be mounted at the desired angle while the gear housing is mounted horizontally. It should be noted that in both forms of the invention disclosed, the forward and reverse gears operate with substantially equal efficiency in both forward and reverse. Thus, for twin screw installations, duplicate engines may be employed and one gear operated forwardly while the other is operated in reverse. Therefore, the premium usually paid for right and left-hand engines may be saved. It will furthermore be noted that the present combined reverse and reducing gear all in one housing saves considerable space and cost. The operation is rendered more trustworthy and there is less likelihood of parts getting out of order when all are combined in one. Furthermore, by the provision of friction clutch reversing and pick-up means in both forward and reverse, relatively simple, cheap forms of positive clutches may be employed in a practical manner, a result not heretofore attainable.

In most cases it is desirable when actuating the forward and reverse gear clutches to throw out the main engine clutch between the engine and the gear. When shifting with the main engine clutch engaged, undue strain is placed upon the friction clutch devices of the gear and wear is likely to be rapid. Therefore, in all cases, except at very slow speeds, the main engine clutch should be disengaged before the shift is attempted.

I have devised improved means acting to first throw out the main engine clutch and hold the same in disengaged position until the forward or reverse gear clutch has been actuated. One form of my improved means for facilitating shifting and which is applicable to those forms of the invention shown in Figs. 1 to 5, is illustrated in Figs. 6 and 7. In Figs. 6 and 7, 80 indicates the engine crank shaft carrying the fly wheel 81. Friction disk clutch members 82—83 are located on opposite sides of the friction clutch disk 84. The clutch disk 84 is carried on the stub shaft 85 corresponding in all substantial respects with the shafts 10—10' heretofore described. Ring 86 is movable in a direction to separate the friction disks therefrom and from fly wheel 81 by means of a plurality of pins 87 and levers 88 in the usual manner and as will be understood. The levers 88 are shifted through a clutch bearing 89 and sleeve 90 which is itself shifted by means of a clutch lever 91. The main engine clutch is engaged upon a release of lever 91 by means of springs 92, all as is now understood in the art.

The forward and reverse gear is substantially the same as heretofore described. In the form shown in Figs. 6 and 7, however, the forward driving pinion is indicated at 93 while the reverse gear pinion is indicated at 94 and drives through an idler gear 95 to the reverse gear 96. The forward drive pinion 93 drives direct to the forward drive gear 97, which gears, as will be understood, are connected to the drive shaft 98 for the propeller. The positive and friction clutches for both forward and reverse driving are the same in construction and operation as heretofore described and include the clutch shift sleeve 99. The clutch shift sleeve 99 is actuated by a fork 100 which, in the present instance, is provided with an upstanding arm which is U-shaped as indicated at 101 to fit and be guided by and on an angular bar 102 extending outwardly into the main clutch housing where, through the adjustable screw 103, it is engageable with the clutch shift lever 91. The opposite end of the angular bar 102 is forked, as indicated at 103', to engage over the shaft 101 which is operable by a manual handle 105 employed for shifting gears.

I have provided means actuated by the shift lever 105 for throwing out the main engine clutch prior to shifting of the gears. In the form shown, the shaft 104 is provided with a fixedly mounted arm 106 movable therewith and which at the end is provided with a cam surface 107 to engage the roller 108 on the angular bar 102. Thus, when the lever 105 is shifted toward the left, the cam surface 107 acting through the roller 108 shifts the bar 102 toward the right so as to throw out the main engine clutch. The cam surface is provided with a depression 109 to ride on the roller and position the same centrally when the gears are in neutral position. The cam surface 107 extends at opposite sides of the depression 109 so that when the lever 105 is shifted in either direction from the neutral position, the bar 102 will be permitted to move toward the left and the main engine clutch engaged by means of springs 92. The arm 106 and the shift fork 100 are interconnected and in the form shown I provide a slotted arm or extension 110 on the shift fork and the arm 106 is provided with a roller 111 to engage within the slot of the arm 110. The slot of the arm 110 is of such formation that when the lever 105 is shifted from its full forward clutched position toward the left, the first action of the arm 106 is to act through the cam surface 107 and roll 108 to disengage the main engine clutch. During this first disengaging movement, the roller 111 moves in that part of the slot 110 which is concentric with the shaft 104 and no movement is transmitted to the clutch shift sleeve 99. When the main engine clutch has been disengaged, further movement of the lever 105 causes the roll 111 to engage in an intermediate part of the slot 110 so as to first disengage the positive clutch and subsequently the friction clutch of the multiple clutch heretofore described. When the depression 109 is in engagement with the roll 108, the clutch shift sleeve and clutches are in neutral position and the main engine clutch is disengaged. Further movement of the lever 105 toward the left will cause the roll 111 engaging in an upper part of the slot 110 to move the clutch shift sleeve 99 toward the right so as to engage the friction clutch of the reverse gear and still further movement causes the engagement of the positive reverse gear clutch, all before the main engine clutch is permitted to engage. Further movement then of the lever 105 toward the left permits left-hand movement of the bar 102 and final engagement of the main engine clutch.

It will be seen that by disengaging the main engine clutch while gear shifting very little strain is placed upon the friction devices of the forward and reverse gear clutches due to the fact that all the friction device has to do is to pick up from either the forward or reverse gear element (being rotated by the propeller shaft), the relatively light stub shaft 85 upon which such gear element is carried, and the main engine clutch disk 84. The main engine clutch disk 84 is relatively light so that each friction device very quickly and readily picks up the few light parts and puts them in rotation in the opposite direction at the proper speed so that the engagement of the positive forward or reverse gear clutch may be shifted without danger of clashing and this regardless of the speed of the propeller shaft, as well as the direction of its rotation.

Re-engagement of the main engine clutch initiates and effects reverse rotation of the stub shaft 85, the gear elements driven thereby and the propeller, the strain or load of reversing being absorbed by the main engine clutch which has sufficient capacity for that purpose.

An additional advantage in employing the automotive type of clutch is that it is self-adjusting and hence reliable in action, which is not true of the clutches of the reverse gear most commonly used in practice.

I have thus provided a very simple means for facilitating gear shifting in that a single gear shift lever on different parts of its movement in gear shifting direction first disengages the main engine clutch and holds the same disengaged before any shifting of the forward and reverse gear clutch either frictional or positive can take place. After the friction and positive clutches have been engaged, and only then, can the main engine clutch be engaged.

While the invention has been described in considerable detail, it is to be understood that various changes and modifications may be made and that certain features may be employed without others all within the scope of the invention as defined in the appended claims.

I claim:

1. In a marine power transmission for driving the propeller of a boat in forward and reverse directions, constant mesh gearing, a double-acting tooth clutch associated therewith for reversing the propeller when turning, said clutch comprising shiftable teeth and forward and reverse teeth selectively engaged thereby and so connected to said gearing that when said shiftable teeth are being shifted from forward to reverse engagement to reverse the rotating propeller, the rotation of the propeller causes the reverse teeth and said shiftable teeth to be driven in opposed rotation, a friction pick-up device operable in response to the shifting of said shiftable teeth to overcome such opposed rotation and to bring the shiftable teeth and reverse teeth into rotation in the same direction at approximately equal speeds prior to engagement thereof, to effect such engagement without clashing irrespective of the speed of rotation of the propeller, and means for relieving said friction pick-up device and said clutch teeth of strain during such shifting including a friction service clutch, and means for holding said service clutch disengaged during such shifting and for re-engaging it after completion of shifting to initiate and effect reverse turning of the propeller through said service clutch and said tooth clutch.

2. In a marine power transmission for driving the propeller of a boat in forward and reverse directions, constant mesh gearing, including forward and reverse reduction gear means, a double-acting tooth clutch associated therewith for reversing the propeller when turning, said clutch comprising shiftable teeth and forward and reverse teeth selectively engaged thereby and so connected to said gearing that when said shiftable teeth are being shifted from forward to reverse engagement to reverse the rotating propeller, the rotation of the propeller causes the reverse teeth to be overdriven in opposed rotation relative to said shiftable teeth, a friction pick-up device operable in response to the shifting of said shiftable teeth to overcome such opposed rotation and to bring the shiftable teeth and reverse teeth into rotation in the same direction at approximately equal speeds prior to engagement thereof, for effecting such engagement without clashing irrespective of the speed of rotation of the propeller, and means for relieving said friction pick-up device and said clutch teeth of strain during such shifting including a friction service clutch, and means for holding said service clutch disengaged during such shifting and for re-engaging it after completion of shifting to initiate and effect reverse turning of the propeller through said service clutch and said tooth clutch.

3. In a marine power transmission for driving the propeller of a boat in forward and reverse directions, constant mesh gearing, a double-acting tooth clutch associated therewith for reversing the propeller when turning, said clutch comprising shiftable teeth and forward and reverse teeth selectively engaged thereby and so connected to said gearing that when said shiftable teeth are being shifted from forward to reverse engagement to reverse the rotating propeller, the rotation of the propeller causes the reverse teeth and said shiftable teeth to be rotated in opposite directions, a friction pick-up device operable in response to the shifting of said shiftable teeth to overcome such opposed rotation and to bring the shiftable teeth and reverse teeth into rotation in the same direction at approximately equal speeds prior to engagement thereof, for effecting such engagement without clashing irrespective of the speed of rotation of the propeller, means for relieving said friction pick-up device and said clutch teeth of strain during such shifting including a friction service clutch, and means for holding said service clutch disengaged during such shifting and for re-engaging it after completion of shifting to initiate and effect reverse turning of the propeller through said service clutch and said tooth clutch, and a single control lever adapted to operate said shiftable teeth, said friction pick-up devices and said service clutch.

4. In a power transmission, a shaft, constant mesh reverse drive gearing, a double acting positive tooth clutch comprising sets of teeth adapted respectively to provide connections to said shaft for forward or reverse driving, forward and reverse friction pick-up devices adapted respectively to overcome opposed rotation of the teeth of each set and to bring the rotation of said teeth into approximate synchronism to permit engagement thereof without clashing, a friction service clutch, and means for disengaging said service clutch to relieve said friction pick-up devices of strain upon shifting said positive tooth clutch to disengage one set of teeth and engage the other set of teeth and for re-engaging said service clutch after completion of said shifting of said positive tooth clutch to initiate and effect forward or reverse driving through said service clutch and said positive tooth clutch.

5. In a power transmission, a shaft, constant mesh forward and reverse drive gearing, a double acting positive tooth clutch comprising sets of teeth adapted respectively to provide connections to said shaft for forward or reverse driving, forward and reverse friction pick-up devices adapted respectively to overcome opposed rotation of the teeth of each set and to bring the rotation of said teeth into approximate synchronism to permit engagement thereof without clashing, a friction service clutch, and means for disengaging said service clutch to relieve said friction pick-up devices of strain upon shifting said positive tooth clutch to disengage one set of teeth and to engage the other set of teeth and for re-engaging said service clutch after completion of said shifting of said positive tooth clutch to initiate and effect forward or reverse driving through said service clutch and said positive tooth clutch.

6. In a power transmission, a shaft, constant mesh reverse drive gearing, a double acting positive tooth clutch comprising sets of teeth adapted respectively to provide connections to said shaft for forward or reverse driving, forward and reverse friction pick-up devices adapted respectively to overcome opposed rotation of the teeth of each set and to bring the rotation of said teeth into approximate synchronism to permit engagement thereof without clashing, releasable connecting means between said friction pick-up devices and said positive tooth clutch for delaying engagement of the teeth of either set until opposed rotation of said teeth is overcome and said teeth are rotating approximately in synchronism, a friction service clutch, and means for disengaging said service clutch to relieve said friction pick-up devices of strain upon shifting said positive tooth clutch to disengage one set of teeth and engage the other set of teeth and for re-engaging said service clutch after completion of said shifting of said positive tooth clutch to initiate and effect forward or reverse driving through said service clutch and said positive tooth clutch.

7. In a power transmission, a shaft, constant mesh reverse drive gearing, a double-acting positive tooth clutch comprising sets of teeth adapted to provide connections to said shaft for forward or reverse driving, forward and reverse friction pick-up devices adapted respectively to overcome opposed rotation of the teeth of each set and to bring the rotation of said teeth into approximate synchronism to permit engagement thereof without clashing, a friction service clutch, a single control lever for the positive tooth and friction service clutches, and connections between said lever and said clutches arranged to disengage the service clutch before shifting said positive tooth clutch to disengage one set of teeth and to consecutively operate one of the friction pick-up devices, to engage the other set of teeth of said positive tooth clutch and finally to engage said service clutch for initiating and effecting either forward or reverse driving through said service clutch and said positive tooth clutch.

DONALD H. MONTGOMERY.